United States Patent [19]
Mukai et al.

[11] Patent Number: 5,928,348
[45] Date of Patent: Jul. 27, 1999

[54] METHOD OF PROCESSING INTERRUPT REQUESTS AND INFORMATION PROCESSING APPARATUS USING THE METHOD

[75] Inventors: Akira Mukai; Norio Masui, both of Tokyo, Japan

[73] Assignee: Mitsubishi Denki Kabushiki Kaisha, Tokyo, Japan

[21] Appl. No.: 08/917,312

[22] Filed: Aug. 25, 1997

[30] Foreign Application Priority Data

Mar. 19, 1997 [JP] Japan .................................. 9-066955

[51] Int. Cl.$^6$ ...................................................... G06F 9/46
[52] U.S. Cl. ............................ 710/263; 710/262; 710/264
[58] Field of Search ................................... 395/733–742, 395/868, 869

[56] References Cited

U.S. PATENT DOCUMENTS

| | | | |
|---|---|---|---|
| 5,499,384 | 3/1996 | Lentz et al. | 395/821 |
| 5,581,771 | 12/1996 | Osakabe | 395/738 |
| 5,630,141 | 5/1997 | Ross et al. | 395/734 |
| 5,659,759 | 8/1997 | Yamada | 395/738 |
| 5,689,713 | 11/1997 | Normoyle et al. | 395/736 |
| 5,701,494 | 12/1997 | Satoh | 395/735 |
| 5,748,970 | 5/1998 | Miyaji et al. | 395/733 |
| 5,784,271 | 7/1998 | Nagasaki | 364/133 |
| 5,819,112 | 10/1998 | Kusters | 395/856 |
| 5,872,982 | 2/1999 | Tipley | 395/728 |

FOREIGN PATENT DOCUMENTS

| | | |
|---|---|---|
| 2-263256 | 10/1990 | Japan . |
| 4-270438 | 9/1992 | Japan . |
| 8-101778 | 4/1996 | Japan . |
| 8-293791 | 11/1996 | Japan . |
| 8-293795 | 11/1996 | Japan . |
| 8-307271 | 11/1996 | Japan . |

*Primary Examiner*—Ayaz R. Sheikh
*Assistant Examiner*—Raymond N. Phan
*Attorney, Agent, or Firm*—Burns, Doane, Swecker & Mathis, LLP

[57] ABSTRACT

A central processing unit (CPU) (162) furnishes an interrupt request acknowledge signal (107) to an interrupt control unit (ICU) (101) in response to an interrupt request signal (106) from the ICU (101). Then the CPU (102) reads the address specifying the origin of a program to process the interrupt request. After that, the CPU (102) causes the interrupt request acknowledge signal (107) to make a transition to its deactivated state. In response to the transition in the interrupt request acknowledge signal, the ICU (101) causes the interrupt request signal (106) to make a transition to its deactivated state and then clears an interrupt priority level signal (108) showing the priority level of the interrupt request (106).

14 Claims, 7 Drawing Sheets

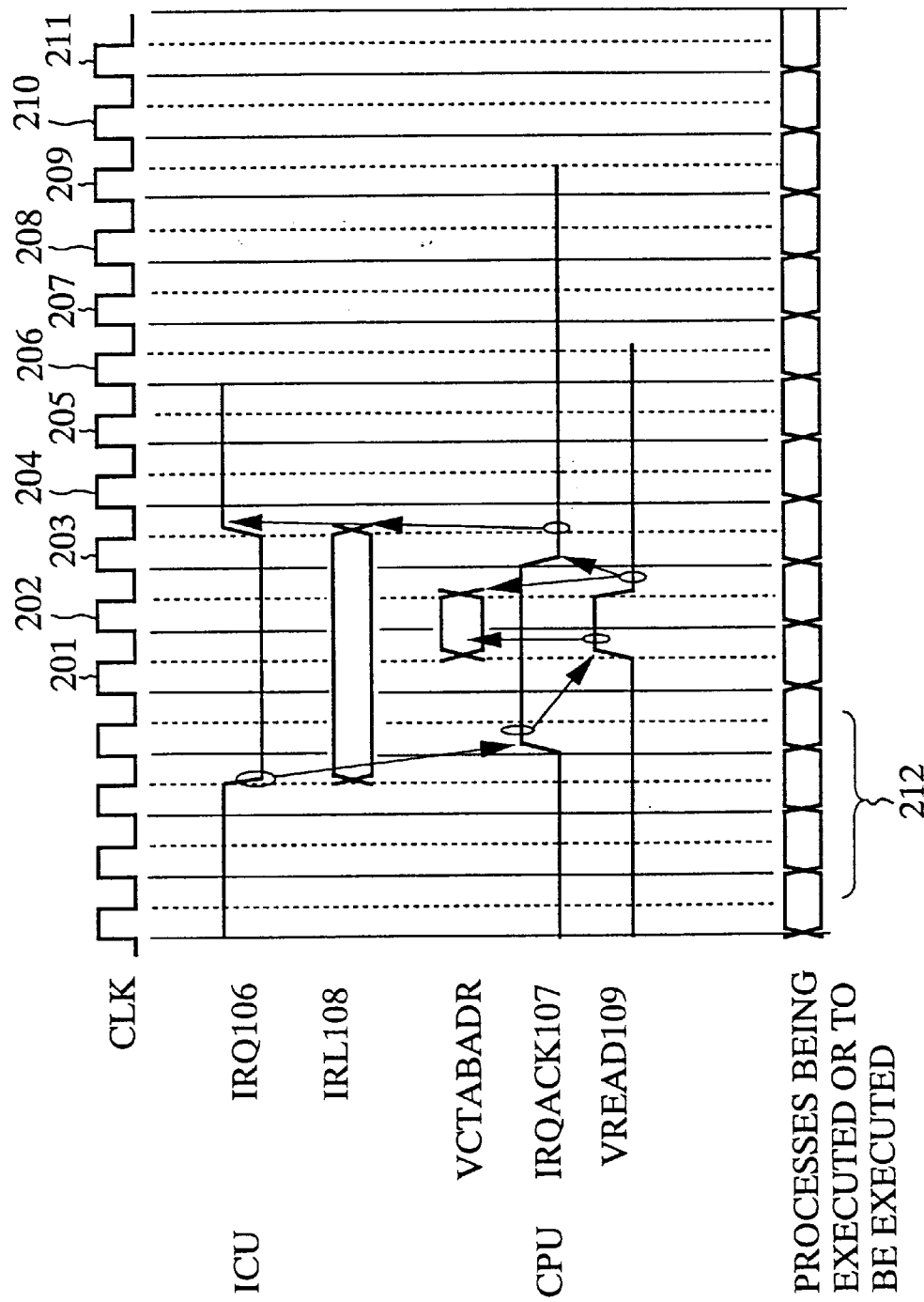

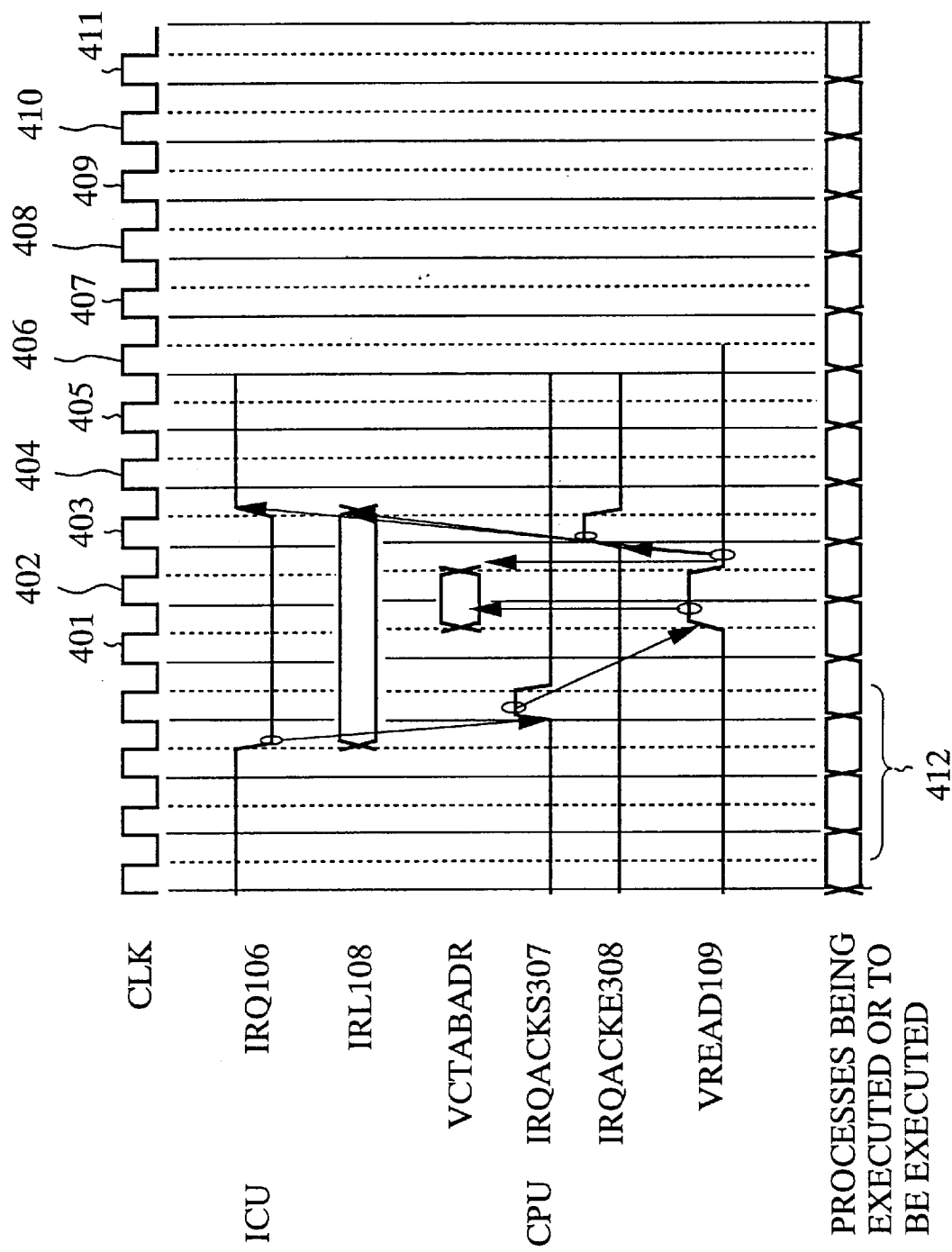

METHOD OF PROCESSING INTERRUPT REQUESTS AND INFORMATION PROCESSING APPARATUS USING THE METHOD

BACKGROUND OF THE INVENTION

1. Field of the Invention

The present invention relates to a method of processing interrupt requests, for receiving interrupt requests from a plurality of peripheral input/output devices and for processing interrupt requests sequentially according to their interrupt priorities, and an information processing apparatus using-the method.

2. Description of the Prior Art

Referring now to FIG. 7, there is illustrated a block diagram showing the structure of a prior art information processing device using a prior art method of processing interrupt requests. In the figure, reference numeral 701 denotes an interrupt control unit (ICU) which receive interrupt signals 104 from a plurality of peripheral input/output devices (not shown in the figure) so as to select the interrupt signal 104 with the highest priority from them and then furnish an interrupt request signal (IRQ) 106 which corresponds to the selected interrupt signal 104, 702 denotes a central processing unit (CPU) which, in response to the IRQ 106 from the ICU 701, completes a series of processes which have been being executed, and, after that, executes a process called an interrupt preprocessing which corresponds to the interrupt request and a microprogram to handle the interrupt request, i.e., an interrupt handler, 103 denotes a memory device for storing the interrupt handler, the address indicating the origin of the interrupt handler (i.e., interrupt vector), and so on, 105 denotes an interrupt mask level signal (IMASK) which is furnished to the ICU 701 by the CPU 702, 707 denotes a read signal (READ) which is furnished to the ICU 701 by the CPU 702 in order for the CPU to read the contents in an interrupt information register (not shown) disposed within the ICU, 110 denotes an address bus, 111 denotes a data bus, 114 denotes a signal line for electrically connecting the ICU 701 to the address bus 110, 115 denotes a signal line for electrically connecting the CPU 702 to the address bus 110, 116 denotes a signal line for electrically connecting the memory device 103 to the address bus 110, 117 denotes a signal line for electrically connecting the ICU 701 to the data bus 111, 118 denotes a signal line for electrically connecting the CPU 702 to the data bus 111, and 119 denotes a signal line for electrically connecting the memory device 103 to the data bus 111.

Referring next to FIG. 8, there is illustrated a timing chart showing the operation of the prior art information processing apparatus of FIG. 7 using the conventional interrupt request processing method. A description will be made as the operation of the prior art information processing apparatus with reference to FIGS. 7 and 8.

Each of the plurality of peripheral input/output devices (not shown) can furnish an interrupt signal 104 to the information processing apparatus. The interrupt signal 104 is a signal which is asserted HIGH or LOW to request an interruption. The ICU 701 having a function of clearing the interrupt signal 104 from one peripheral input/output device which is an interrupt request source selects the interrupt signal 104 with the highest priority from the plurality of interrupt signals 104 received. Furthermore, the ICU 701 compares the interrupt priority assigned to the selected interrupt signal 104 with the interrupt mask level indicated by the IMASK 105 delivered by the CPU 702. As a result, if the interrupt priority of the interrupt signal 104 is greater than the interrupt mask level, the ICU 701 furnishes the IRQ 106 which corresponds to the selected interrupt signal 104 to the CPU 702. Then, the ICU 701 writes an interrupt priority level 901 assigned to the IRQ 106 which is delivered to the CPU 702 and an interrupt vector table address (VCTABADR) 902 showing the address of an interrupt vector table storing the address specifying the origin of the corresponding interrupt handler into its interrupt information register (not shown in FIG. 7), as shown in FIG. 9.

When the CPU 702 receives the IRQ 106 from the ICU 701, it completes a series of processes 816 shown in FIG. 8 which have been being executed just before it receives the IRQ 106 and, after that, starts a process called an interrupt preprocessing in order to process the interrupt request. First, the CPU 702 saves or clears the value of the program status word in clock cycle 801. Then the CPU 702 furnishes the READ 707 to enable the ICU 701 to send out the interrupt priority level 901 and VCTABADR 902 as shown in FIG. 9 on the data bus 111, so that the CPU 702, in clock cycles 802 and 803, reads the interrupt priority level 901 and VCTABADR 902 on the data bus 111.

After that, the ICU 701 causes the IRQ 106 to make a HIGH to LOW transition, so that the IRQ 106 is deactivated. On the other hand, the CPU 702 copies the interrupt priority level 901 to the program status word in clock cycle 804, and then expands the 16-bit VCTABADR 902 to a 32-bit interrupt vector table address in clock cycle 805. Next, the CPU 702, in clock cycle 806, sends out the expanded VCTABADR 902 showing the memory location at which the address specifying the origin of the interrupt handler which can handle the interrupt request is stored on the address bus 110 by way of the signal line 115, and then reads, by way of the signal line 118, the address specifying the origin of the interrupt handler which is delivered on the data bus 111 by the memory device 103. After that, the CPU 702 continues to perform the interrupt preprocessing and then executes the interrupt handler following the completion of the interrupt preprocessing.

In the operation, the IRQ 106 from the ICU 701 makes a transition to its deactivated state when the CPU 702 finishes reading the contents in the interruption information register of the ICU 701. Simultaneously, the interrupt priority level 901 is cleared. Furthermore, in the mode wherein it is determined that while the interrupt signal 104 applied is asserted HIGH or LOW, the interruption is enabled, whereas while the interrupt signal 104 is at the reversed state, the interruption is disabled, when the corresponding peripheral input/output device clears the interrupt signal 104, the ICU 701 causes the IRQ 106 to make a transition to its deactivated state.

When the interrupt request source cancels the interrupt request so as to clear the interrupt signal 104 and then cause the IRQ 106 to make a transition to its deactivated state before the CPU 702 finishes reading the contents in the interrupt information register in response to the IRQ 106, the CPU cannot initiate the proper interrupt handler. To avoid this malfunction, a measure to start a given interrupt handler when the CPU comes upon the situation is taken.

Referring next to FIG. 10, there is illustrated a block diagram showing the structure of an information processing apparatus using another conventional interrupt processing method as disclosed in Japanese Patent Application Laying Open (KOKAI) No. 2-263256. In the figure, the same components as the information processing apparatus shown in FIG. 7 are designated by the same reference numerals, and therefore the description about the components will be omitted hereinafter. In FIG. 10, reference numeral 107 denotes an interrupt request acknowledge signal (IRQACK). The CPU 702 furnishes the IRQACK 107 to the ICU 701 in response to the IRQ 106 from the ICU 701.

The ICU 701 selects one interrupt signal 104 with the highest interrupt priority from a plurality of interrupt signals 104 received according to their interrupt priorities. Then the ICU 701 furnishes the IRQ 106 which corresponds to the selected interrupt signal 104 with the highest interrupt priority to the CPU 702 so as to initiate an interrupt receiving process. When the CPU 702 receives the IRQ 106 from the ICU 701, the CPU 702 completes a series of processes which have been being executed Just before the CPU 702 receives the IRQ 106, and, after that, causes the IRQACK 107 to make a LOW to HIGH transition to acknowledge receipt of the interrupt. When the ICU 701 then detects that the IRQACK 107 makes a LOW to HIGH transition, it sends out an interrupt vector, i.e., an address specifying the origin of the interrupt handler on the address bus 110 by way of the signal line 114.

When the memory device 103 reads the interrupt vector on the address bus 110 by way of the signal line 116, the memory device 103 sends out an instruction addressed by the interrupt vector, i.e., the first instruction code of the interrupt handler on the data bus 111 by way of the signal line 119. The CPU 702 reads the instruction code via the data bus and then starts to execute the interrupt handler.

In Japanese Patent Application Laying Open (KOKAI) No. 2-263256, there is no description about how the CPU 702 processes the interrupt request when the corresponding interrupt source clears the interrupt signal 104 and then causes the IRQ 106 to make a transition to its deactivated state so as to cancel the interrupt request before the CPU 702 finishes reading the interrupt vector in response to the IRQ 106.

Since such a prior art information processing apparatus using a conventional interrupt processing method is so constructed as mentioned above, there is a problem in that a proper interrupt handler cannot be executed if the peripheral input/output device which is a corresponding interrupt request source clears the interrupt signal before the CPU 702 which has detected the generation of the IRQ 106 finishes reading the contents in the interrupt information register, or before the CPU 702 finishes reading the interrupt vector.

SUMMARY OF THE INVENTION

The present invention is made to overcome the problem. It is therefore an object of the present invention to provide an interrupt processing method capable of properly performing an interrupt preprocessing and then reliably executing an interrupt handler to process or handle an interrupt request even though the peripheral input/output device which is a corresponding interrupt request source clears the interrupt signal before the CPU which has detected the generation of the interrupt request signal finishes reading an address specifying the origin of the interrupt handler, i.e., an interrupt vector, and an information processing apparatus using the method.

In accordance with one aspect of the present invention, there is provided an interrupt processing method of receiving interrupt signals furnished by a plurality of peripheral input/output devices and selecting one interrupt signal with the highest priority from the interrupt signals received so as to generate an interrupt request signal and an interrupt priority level signal showing the interrupt priority of the interrupt request signal, and executing a program to process the interrupt request using a central processing unit (CPU), the method comprising the steps of: causing the CPU to furnish an interrupt request acknowledge signal and further a vector table address output permission signal in response to the interrupt request signal; sending out an interrupt vector table address on an address bus in response to the vector table address output permission signal from the CPU; causing a memory device to send out an address of the origin of the program to process the interrupt request on a data bus according to the interrupt vector table address on the address bus; and holding the interrupt request signal at its active state and the value of the interrupt priority level signal during a period of time which is defined by the interrupt request acknowledge signal such that even though the interrupt signal which caused the interrupt request signal is cleared, the program can process the interrupt request.

In accordance with a preferred embodiment of the present invention, the interrupt request holding step is the step of holding the interrupt request signal at its active state and the value of the interrupt priority level signal at least until the CPU finishes reading the address specifying the origin of the program handling the interrupt request.

Preferably, the CPU causes the interrupt request acknowledge signal to make a transition to its deactivated state when the CPU finishes reading the address specifying the origin of the program handling the interrupt request. Furthermore, the interrupt request holding step is the step of, responsive to the transition in the interrupt request acknowledge signal, causing the interrupt request signal to make a transition to its deactivated state and clearing the interrupt priority level signal.

In accordance with another preferred embodiment of the present invention, when the CPU finishes reading the address specifying the origin of the program handling the interrupt request, the CPU furnishes an interrupt request acknowledge end signal. Furthermore, the interrupt request holding step is the step of, in response to the interrupt request acknowledge end signal from the CPU, causing the interrupt request signal to make a transition to its deactivated state and clearing the interrupt priority level signal.

In accordance with another preferred embodiment of the present invention, the interrupt request holding step is the step of holding the interrupt request signal at its active state and the value of the interrupt priority level signal during a predetermined period of time since the receipt of the interrupt request acknowledge signal from the CPU.

In accordance with another preferred embodiment of the present invention, the interrupt request holding step includes the step of holding the interrupt request signal at its active state and the value of the interrupt priority level signal during a predetermined period of time since the receipt of the vector table address output permission signal delivered by the CPU following the receipt of the interrupt acknowledge signal.

In accordance with another aspect of the present invention, there is provided an information processing apparatus comprising: an interrupt control unit (ICU) for receiving interrupt signals furnished by a plurality of peripheral input/output devices and for selecting one interrupt signal with the highest priority from the interrupt signals received so as to furnish an interrupt request signal and an interrupt priority level signal showing the interrupt priority of the interrupt request signal; a central processing unit (CPU) being responsive to the interrupt request signal from the ICU, for furnishing an interrupt request acknowledge signal to the ICU, and, after that, furnishing a vector table address output permission signal to enable the ICU to send out an interrupt vector table address on an address bus; and a memory device connected to the ICU and the CPU via the address bus and a data bus, for receiving the interrupt vector table address which the ICU has sent out on the address bus and sending out an address specifying the origin of a program to process the interrupt request on the data bus. Furthermore, the ICU can hold the interrupt request signal at its active state and the value of the interrupt priority level signal during a period of time which is defined by the interrupt request acknowledge signal such that even though the interrupt signal which caused the interrupt request signal is cleared, the memory device can furnish the address showing the origin of the program and then the program can process the interrupt request.

In accordance with a preferred embodiment of the present invention, the ICU holds the interrupt request signal at its active state and the value of the interrupt priority level signal at least until the CPU finishes reading the address specifying the origin of the program handling the interrupt request.

Preferably, the CPU causes the interrupt request acknowledge signal to make a transition to its deactivated state when the CPU finishes reading the address specifying the origin of the program handling the interrupt request. Furthermore, in response to the transition in the interrupt request acknowledge signal, the ICU causes the interrupt request signal to make a transition to its deactivated state and then clears the interrupt priority level signal.

In accordance with another preferred embodiment of the present invention, when the CPU finishes reading the address specifying the origin of the program handling the interrupt request, the CPU furnishes an interrupt request acknowledge end signal to the ICU. In response to the interrupt request acknowledge end signal, the ICU causes the interrupt request signal to make a transition to its deactivated state and then clears the interrupt priority level signal.

In accordance with another preferred embodiment of the present invention, the ICU holds the interrupt request signal at its active state and the value of the interrupt priority level signal during a predetermined period of time since the ICU received the interrupt request acknowledge signal from the CPU. Preferably, the ICU can set the predetermined period of time during which the interrupt request signal is held at its active state and the value of the interrupt priority level signal is held, by using software.

In accordance with another preferred embodiment of the present invention, the ICU holds the interrupt request signal at its active state and the value of the interrupt priority level signal during a predetermined period of time since the ICU received the vector table address output permission signal delivered by the CPU following the receipt of the interrupt acknowledge signal. Preferably, the ICU can set the predetermined period of time during which the interrupt request signal is held at its active state and the value of the interrupt priority level signal is held, by using software.

Further objects and advantages of the present invention will be apparent from the following description of the preferred embodiments of, the invention as illustrated in the accompanying drawings.

BRIEF DESCRIPTION OF THE DRAWINGS

FIG. 2 is a timing chart showing the operation of the information processing apparatus of FIG. 1 using the interrupt processing method according to the first embodiment;

FIG. 4 is a timing chart showing the operation of the information processing apparatus of FIG. 3 using the interrupt processing method according to the second embodiment;

DETAILED DESCRIPTION OF THE PREFERRED EMBODIMENTS

First Embodiment

Figure 1:
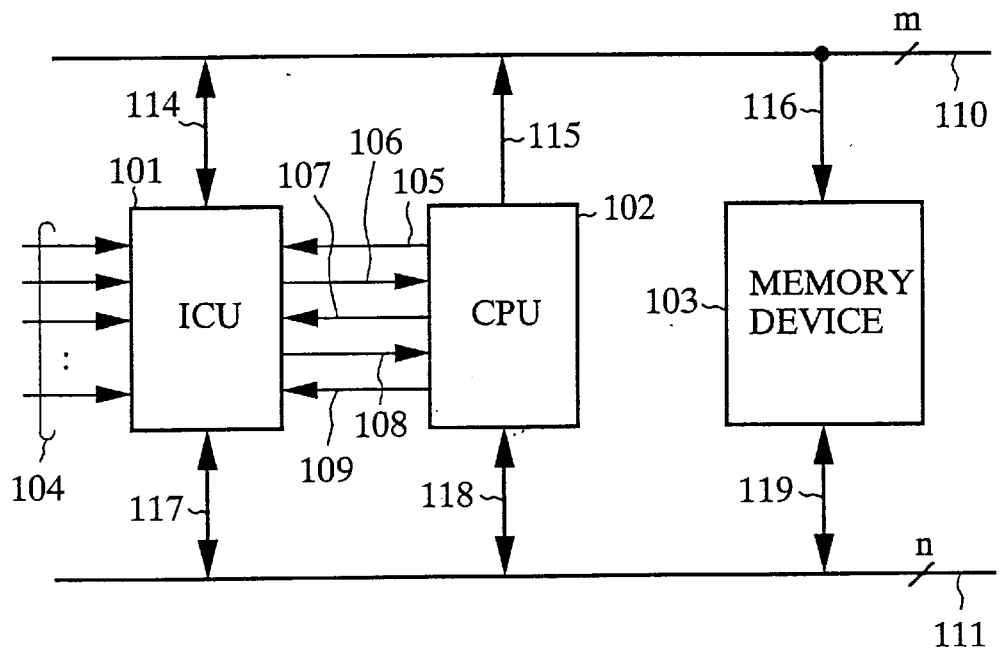
FIG. 1 is a block diagram showing the structure of an information processing device using an interrupt processing method according to a first embodiment of the present invention.

Referring now to FIG. 1, there is illustrated a block diagram showing the structure of an information processing device using an interrupt processing method according to a first embodiment of the present invention. In the figure, reference numeral 101 denotes an interrupt control unit (ICU) which receives interrupt signals 104 from a plurality of peripheral input/output devices (not shown in the figure) and selects the interrupt signal 104 with the highest priority from them according to their predetermined interrupt priorities. The ICU 101 furnishes an interrupt request signal (IRQ) 106 which corresponds to the selected interrupt signal 104 if the interrupt priority of the selected signal 104 is greater than the interrupt priority indicated by a mask level signal (IMASK) 105. Furthermore, reference numeral 102 denotes a central processing unit (CPU) which, in response to the IRQ 106 from the ICU 101, completes a series of processes which have been being executed Just before the CPU receives the IRQ 106, and, after that, executes a process called an interrupt preprocessing which corresponds to the interrupt request and a microprogram for handling the interrupt request, i.e., an interrupt handler, and 107 denotes an interrupt request acknowledge signal (IRQACK). The CPU 102 furnishes the IRQACK 107 to the ICU 101 in response to the IRQ 106 from the ICU 101. Furthermore, reference numeral 108 denotes an interrupt priority level signal (IRL) showing the interrupt priority of the IRQ 106 which is furnished to the CPU 102 by the ICU 101, and 109 denotes a vector table address output permission signal (VREAD) which is furnished to the ICU 101 by the CPU 102, and which enables the ICU 101 to send out the VCTABADR on an address bus 110.

Referring next to FIG. 2, there is illustrated a timing chart showing the operation of the information processing apparatus of FIG. 1 using the interrupt processing method according to the first embodiment of the present invention. A description will be made as the operation of the information processing apparatus with reference to FIGS. 1 and 2.

Figure 9:
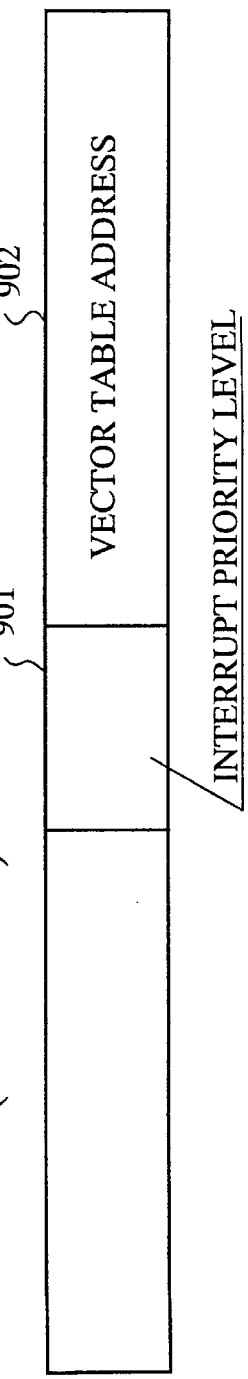
FIG. 9 is a view showing the contents in an interrupt information register disposed within an interrupt control circuit.

Each of the plurality of peripheral input/output devices not shown in FIG. 1 can furnish an interrupt signal 104 to the information processing apparatus according to the first embodiment. The interrupt signal 104 is a signal which is asserted HIGH or LOW to request an interruption. The ICU 101 having a function of clearing an interrupt signal 104 from one peripheral input/output device which is an interrupt request source selects the interrupt signal 104 with the highest interrupt priority from a plurality of interrupt signals 104 received. Furthermore, the ICU 101 compares the interrupt priority assigned to the selected interrupt signal 104 with the interrupt mask level indicated by the IMASK 105 delivered by the CPU 102. As a result, if the interrupt priority of the interrupt signal 104 is greater than the interrupt mask level, the ICU 101 furnishes the IRQ 106 which corresponds to the selected interrupt signal 104 to the CPU 102. Then the ICU 101 writes an interrupt priority level 901 assigned to the IRQ 106 which is delivered to the CPU 102 and a VCTABADR 902 showing the address of an interrupt vector table storing the address specifying the origin of a corresponding interrupt handler into its interrupt information register (not shown in FIG. 1), as shown in FIG. 9.

When the CPU 102 receives the IRQ 106 from the ICU 101, it furnishes the IRQACK 107 to the ICU 101. On the other hand, the ICU 101 delivers the IRL 108 to the CPU 102 in synchronization with the delivery of the IRQ 106 to the CPU 102. While the IRQACK 107 furnished by the CPU 102 is held at its HIGH state (i.e., during a period of time defined by the IRQACK 107), the ICU 101 keeps holding the IRQ 106 at its active state (i.e., LOW state) even though the peripheral input/output device which is an interrupt request source clears the interrupt signal 104. Thus, the ICU 101 keeps holding the value of IRL 108 and the value of the VCTABADR which will be explained later. That is, the ICU 101 holds the contents in the interrupt information register (not shown in FIG. 1) disposed therein.

Next, the CPU 102 completes a series of processes 212 which have been being executed just before it receives the IRQ 106 and, after that, starts a process called an interrupt preprocessing which corresponds to the IRQ 106. First, the CPU 102, in clock cycle 201 shown in FIG. 2, saves or clears the value of the program status word, and makes a signal line 115 connecting the CPU 102 to the address bus 110 be of high resistance. After that, the CPU 102 furnishes the VREAD 109 to cause the ICU 101 to send out the VCTABADR on the address bus 110 at a time which is dependent on the condition of the process within the CPU 102. When the ICU 101 receives the VREAD 109 from the CPU 102, the ICU 101 sends out the VCTABADR showing the memory location at which the address specifying the origin of a microprogram to handle the interrupt request, i.e., an interrupt handler is stored on the address bus 110. At that time, since the signal line 115 extending from the CPU 102 is held at its high-impedance state, the VCTABADR is injected into a memory device 103 by way of a signal line 116 connecting the address bus 110 to the memory device 103. As a result, the memory device 103 sends out the address indicating the origin of the interrupt handler on the data bus 111 by way of a signal line 119 connecting the memory device 103 to the data bus 111. Then the CPU 102, in clock cycle 202 shown in FIG. 2, reads the address specifying the origin of the interrupt handler on the data bus 111 by way of a signal line 118 connecting the CPU 102 to the data bus 111.

Next, in order to push the address of a process which is scheduled to be executed after the execution of the process 212, which has been temporarily suspended to process the interrupt request, i.e., the current contents in the program counter onto a stack, the CPU 102, in clock cycle 203, calculates the address specifying the locations within the stack at which the current contents in the program counter are to be stored, i.e., the stack pointer. Then the CPU 102, in clock cycle 204, pushes the current contents in the program counter onto the stack, and, after that, performs the remainder of the interrupt preprocessing and then starts to execute the interrupt handler. On the other hand, when the CPU 102 reads the address showing the origin of the interrupt handler to process the interrupt request, the CPU 102 causes the VREAD 109 furnished to the ICU 101 to make a HIGH to LOW transition such that the VREAD 109 is deactivated. Furthermore, the CPU 102 causes the IRQACK 107 to make a HIGH to LOW transition. In response to the transition in the IRQACK 107, the ICU 101 clears the IRL 108 and then causes the IRQ 106 to make a LOW to HIGH transition such that the IRQ 106 is deactivated. Thus, the ICU 101 clears the contents in the interrupt information register. Accordingly, the ICU 101 makes it possible to select the interrupt request with the highest priority from a plurality of delayed interrupt requests in order to process the next interrupt request and cause the memory device to furnish a vector table address which corresponds to the next interrupt request with the highest priority. After that, the CPU 102 and ICU 101 repeat the above operation so as to perform the interrupt preprocessing for the next interrupt request, and the CPU 102 then executes the interrupt handler to handle the next interrupt request.

As previously explained, the information processing apparatus according to the first embodiment of the present invention keeps holding the IRQ 106 at its active state and delivering the IRL 108 even though the interrupt signal 104 furnished by one peripheral input/output device which is an interrupt request source is cleared during the interrupt preprocessing. Therefore, the first embodiment offers an advantage in that the CPU 102 can reliably execute an interrupt handler to process an interrupt request once the interrupt request is generated.

Second Embodiment

Figure 3:
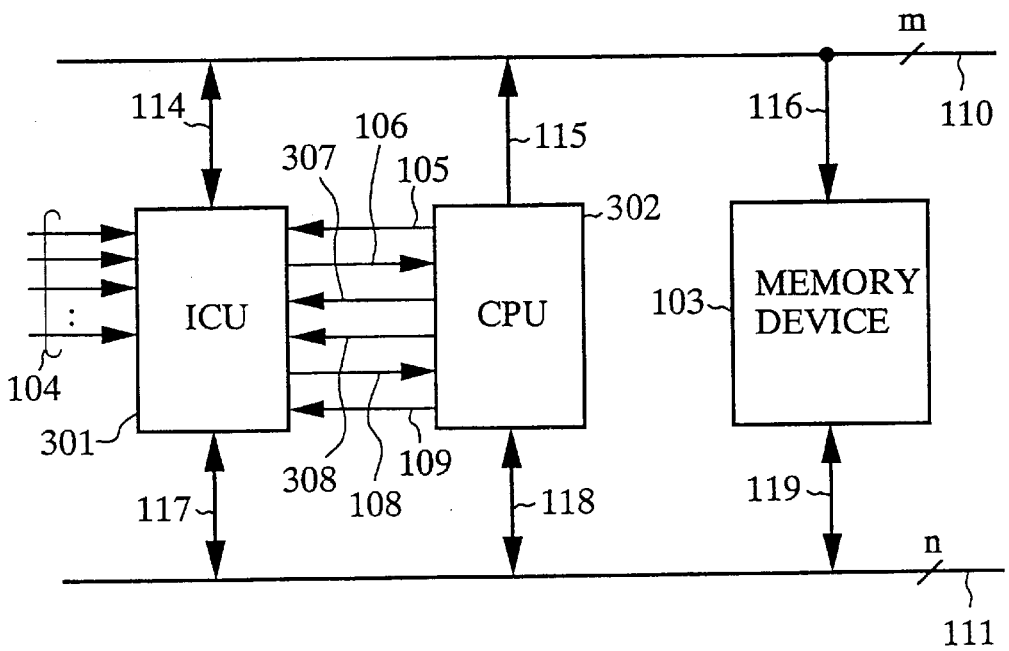
FIG. 3 is a block diagram showing the structure of an information processing device using an interrupt processing method according to a second embodiment of the present invention.

Referring now to FIG. 3, there is illustrated a block diagram showing the structure of an information processing device using an interrupt processing method according to a second embodiment of the present invention. In the figure, the same components as the information processing apparatus according to the aforementioned first embodiment are designated by the same reference numerals as FIG. 1, and therefore the description about the components will be omitted hereinafter. In FIG. 3, reference numeral 301 denotes an ICU which receives interrupt signals 104 from a plurality of peripheral input/output devices (not shown in the figure) and selects the interrupt signal 104 with the highest priority from them according to their predetermined interrupt priorities. The ICU 301 furnishes an IRQ 106 which corresponds to the selected interrupt signal 104 if the interrupt priority of the selected signal 104 is greater than the interrupt priority indicated by a mask level signal (IMASK) 105. Furthermore, in response to an interrupt request acknowledge END signal (IRQACKE) 308 delivered by a CPU, the ICU 301 causes the IRQ 106 to make a transition to its deactivated state and then clears the IRL 108. Reference numeral 302 denotes the CPU which, in response to the IRQ 106 from the ICU 301, furnishes an interrupt request acknowledge START signal (IRQACKS) 307 to the ICU 301 and then completes a series of processes which have been being executed just before the CPU receives the IRQ 106, and, after that, the CPU 301 executes the interrupt preprocessing. In the interrupt preprocessing, the CPU 301 reads the address specifying the origin of the interrupt handler to process the interrupt request and furnishes the IRQACKE 308 to the ICU 301. Then the CPU 301 executes the interrupt handler handling the interrupt request.

Referring next to FIG. 4, there is illustrated a timing chart showing the operation of the information processing apparatus of FIG. 3 using the interrupt processing method according to the second embodiment of the present invention. A description will be made as the operation of the information processing apparatus with reference to FIGS. 3 and 4.

Like the above-mentioned first embodiment, the ICU 301 selects the interrupt signal 104 with the highest priority from a plurality of interrupt signals 104 received. Furthermore, the ICU 301 compares the interrupt priority assigned to the selected interrupt signal 104 with the interrupt mask level indicated by the IMASK 105 delivered by the CPU 302. As a result, if the interrupt priority of the interrupt signal 104 is greater than the interrupt mask level, the ICU 301 furnishes the IRQ 106 which corresponds to the selected interrupt signal 104 to the CPU 302. Then, the ICU 301 writes an interrupt priority level 901 assigned to the IRQ 106 which is delivered to the CPU 302 and a VCTABADR 902 showing the address of an interrupt vector table storing the address specifying the origin of a corresponding interrupt handler into its interrupt information register (not shown in FIG. 3), as shown in FIG. 9.

When the CPU 302 receives the IRQ 106 from the ICU 301, it furnishes the IRQACKS 307 to the ICU 301. On the other hand, the ICU 301 delivers the IRL 108 to the CPU 302 in synchronization with the delivery of the IRQ 106 to the CPU 302. Once the ICU 301 receives the IRQACKS 307 furnished by the CPU 302, the ICU 301 keeps holding the IRQ 106 at its active state (i.e., LOW state) until it receives the IRQACKE 308 from the CPU 302 (i.e., during a period of time defined by the IRQACKS 307 and IRQACKE 308) even though the peripheral input/output device which is an interrupt request source clears the interrupt signal 104. Thus, the ICU 301 keeps holding the value of IRL 108 and the value of the VCTABADR which will be explained later. That is, the ICU 301 holds the contents in the interrupt information register (not shown in FIG. 3) disposed therein.

Next, the CPU 302 completes a series of processes 412 which have been being executed just before it receives the IRQ 106 and, after that, starts a process called an interrupt preprocessing which corresponds to the IRQ 106. First, the CPU 302, in clock cycle 401 shown in FIG. 4, saves or clears the value of the program status word, and makes a signal line 115 connecting the CPU 302 to the address bus 110 be of high resistance. After that, the CPU 302 furnishes the VREAD 109 to enable the ICU 301 to send out the VCTABADR on the address bus 110 at a time which is dependent on the condition of the process within the CPU 301. When the ICU 301 receives the VREAD 109 from the CPU 302, the ICU 301 sends out the VCTABADR showing the memory location at which the address specifying the origin of a microprogram i.e., an interrupt handler to handle the interrupt request is stored on the address bus 110. At that time, since the signal line 115 extending from the CPU 302 is held at its high-impedance state, the VCTABADR is injected into the memory device 103 by way of the signal line 116 connecting the address bus 110 to the memory device 103. As a result, the memory device 103 sends out the address specifying the origin of the interrupt handler on the data bus 111 by way of the signal line 119 connecting the memory device 103 to the data bus 111. Then the CPU 302, in clock cycle 402 shown in FIG. 4, reads the address indicating the origin of the interrupt handler on the data bus 111.

Next, in order to push the address of a process which is scheduled to be executed after the execution of the process 412, which has been temporarily suspended to process the interrupt, i.e., the current contents in the program counter onto a stack, the CPU 302, in clock cycle 403, calculates the address specifying the locations within the stack at which the current contents in the program counter are to be stored, i.e., the stack pointer. Then the CPU 302, in clock cycle 404, pushes the current contents in the program counter onto the stack, and, after that, performs the remainder of the interrupt preprocessing and then starts to execute the interrupt handler. On the other hand, when the CPU 302 finishes reading the address showing the origin of the interrupt handler to process the interrupt request, the CPU 302 causes the VREAD 109 furnished to the ICU 301 to make a HIGH to LOW transition such that the VREAD 109 is deactivated. Furthermore, the CPU 302 furnishes the IRQACKE 308 to the ICU 301. In response to the IRQACKE 308, the ICU 301 clears the IRL 108 and then causes the IRQ 106 to make a LOW to HIGH transition such that the IRQ 106 is deactivated. Thus, the ICU 301 clears the contents in the interrupt information register. Accordingly, the ICU 301 makes it possible to select the interrupt request with the highest priority from a plurality of delayed interrupt requests in order to handle the next interrupt request and cause the memory device to furnish a vector table address which corresponds to the next interrupt request with the highest priority. After that, the CPU 302 and ICU 301 repeat the above operation so as to perform the interrupt preprocessing for the next interrupt request, and the CPU 302 then executes the interrupt handler handling the next interrupt request.

As previously explained, the information processing apparatus according to the second embodiment of the present invention keeps holding the IRQ 106 at its active state and delivering the IRL 108 by means of the ICU 301 even though the interrupt signal 104 furnished by one peripheral input/output device which is an interrupt request source is cleared during the interrupt preprocessing. Therefore, the second embodiment offers an advantage in that the CPU 302 can reliably execute an interrupt handler to process an interrupt request once the interrupt request is generated.

Third Embodiment

Figure 5:
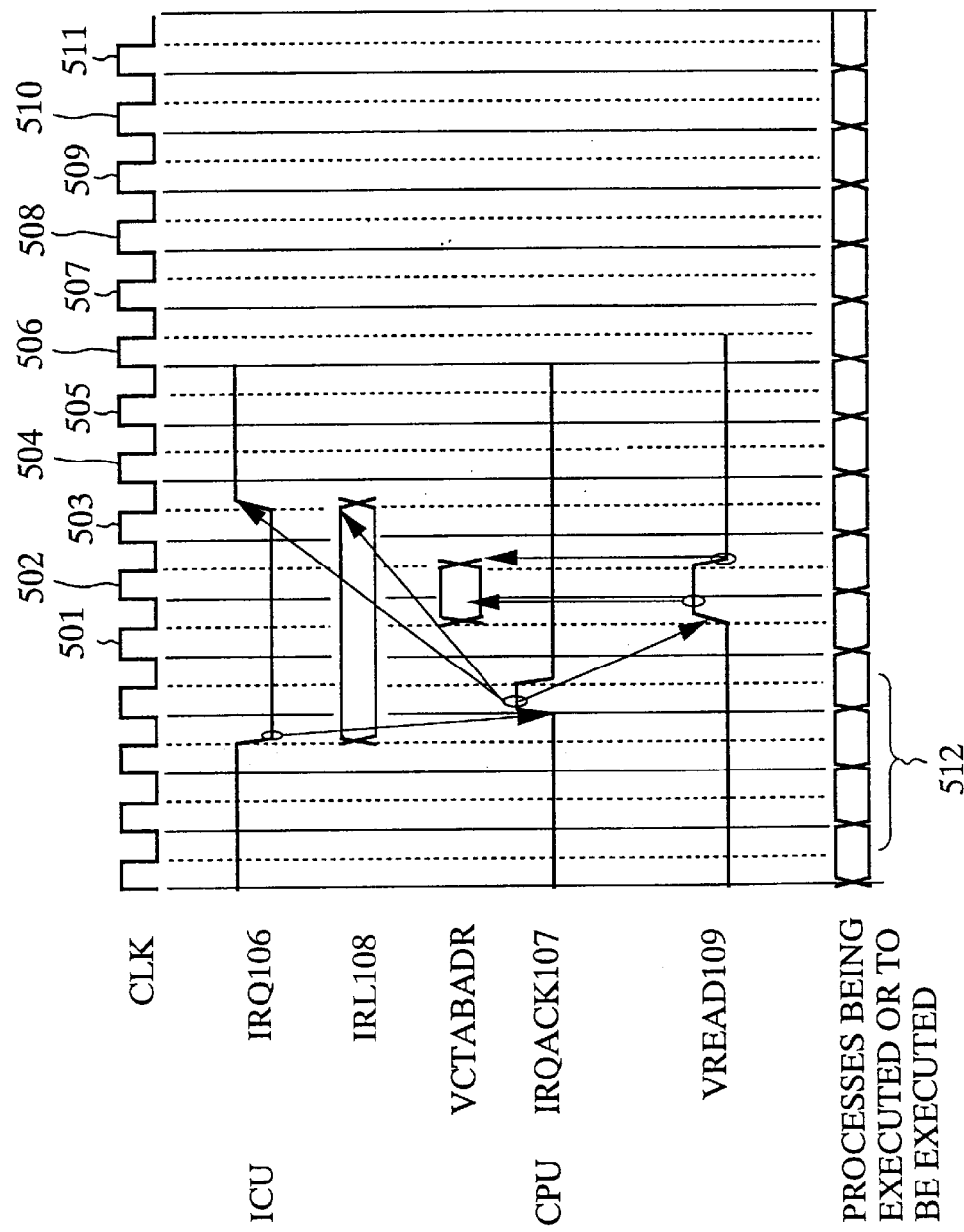
FIG. 5 is a timing chart showing the operation of an information processing apparatus using an interrupt processing method according to a third embodiment of the present invention.

Referring now to FIG. 5, there is illustrated a timing chart showing the operation of an information processing apparatus using an interrupt processing method according to a third embodiment of the present invention. While the information processing apparatus according to the third embodiment has the same structure as that of the above-mentioned first embodiment shown in FIG. 1, the information processing apparatus according to the third embodiment differs from that of the above-mentioned first embodiment in that the ICU 101 of this embodiment is adapted to keep holding the IRQ 106 delivered by the ICU 101 at its active state and the value of the IRL 108 during a predetermined period of time after the ICU 101 receives the IRQ 106.

Like the above-mentioned first embodiment, the ICU 101 selects the interrupt signal 104 with the highest priority from a plurality of interrupt signals 104 received. Furthermore, the ICU 101 compares the interrupt priority assigned to the selected interrupt signal 104 with the interrupt mask level indicated by the IMASK 105 delivered by the CPU 102. As a result, if the interrupt priority of the interrupt signal 104 is greater than the interrupt mask level, the ICU 101 furnishes the IRQ 106 which corresponds to the selected interrupt signal 104 to the CPU 102. Then the ICU 101 writes an interrupt priority level 901 assigned to the IRQ 106 which is delivered to the CPU 102 and a VCTABADR 902 showing the address of an interrupt vector table storing the address specifying the origin of a corresponding interrupt handler into its interrupt information register (not shown in FIG. 1), as shown in FIG. 9.

When the CPU 102 receives the IRQ 106 from the ICU 101, it furnishes the IRQACK 107 to the ICU 101. On the other hand, the ICU 101 delivers the IRL 108 to the CPU 102 in synchronization with the delivery of the IRQ 106 to the CPU 102. When the ICU 101 receives the IRQACK 107 furnished by the CPU 102, the ICU 101 keeps holding the IRQ 106 at its active state (i.e., LOW state) during a predetermined period of time. Thus, the ICU 101 keeps holding the value of IRL 108 and the value of the VCTABADR which will be explained later. That is, the ICU 101 holds the contents in the interrupt information register (not shown in FIG. 1) disposed therein. It should be noted that the above-mentioned predetermined period of time is defined as a period of time during which the CPU 102 can read the address specifying the origin of the interrupt handler so as to reliably execute the interrupt handler.

Next, the CPU 102 completes a series of processes 512 which have been being executed just before it receives the IRQ 106 and, after that, starts a process called an interrupt preprocessing which corresponds to the IRQ 106. First, the CPU 102, in clock cycle 501 shown in FIG. 5, saves or clears the value of the program status word, and makes the signal line 115 connecting the CPU 102 to the address bus 110 be of high resistance. After that, the CPU 102 furnishes the VREAD 109 to enable the ICU 101 to send out the VCTABADR on the address bus 110 at a time which is dependent on the condition of the process within the CPU 101. When the ICU 101 receives the VREAD 109 from the CPU 102, the ICU 101 sends out the VCTABADR showing the memory location at which the address specifying the origin of a microprogram, i.e., the interrupt handler to handle the interrupt request is stored on the address bus 110. At that time, since the signal line 115 extending from the CPU 102 is held at its high-impedance state, the VCTABADR is injected into the memory device 103 by way of the signal line 116 connecting the address bus 110 to the memory device 103. As a result, the memory device 103 sends out the address indicating the origin of the interrupt handler on the data bus 111 by way of the signal line 119 connecting the memory device 103 to the data bus 111. Then the CPU 102, in clock cycle 502 shown in FIG. 5, reads the address indicating the origin of the interrupt handler on the data bus 111.

Next, in order to push the address of a process which is scheduled to be executed after the execution of the process 512, which has been temporarily suspended to process the interrupt, i.e., the current contents in the program counter onto a stack, the CPU 102, in clock cycle 503, calculates the address specifying the locations within the stack at which the current contents in the program counter are to be stored, i.e., the stack pointer. Then the CPU 102, in clock cycle 504, pushes the current contents in the program counter onto the stack, and, after that, performs the remainder of the interrupt preprocessing and then starts to execute the interrupt handler. On the other hand, when the CPU 102 finishes reading the address showing the origin of the interrupt handler handling the interrupt request, the CPU causes the VREAD 109 furnished to the ICU 101 to make a HIGH to LOW transition such that the VREAD 109 is deactivated. After that, when the predetermined period of time elapses since the ICU 101 received the IRQACK 107, the ICU 101 causes the IRQ 106 to make a LOW to HIGH transition such that the IRQ 106 is deactivated, and simultaneously clears the IRL 108. Thus, the ICU 101 clears the contents in the interrupt information register. Accordingly, the ICU 101 makes it possible to select the interrupt request with the highest priority from a plurality of delayed interrupt requests in order to handle the next interrupt request and cause the memory device to furnish a vector table address which corresponds to the next interrupt request with the highest priority. After that, the CPU 102 and ICU 101 repeat the above operation so as to perform the interrupt preprocessing for the next interrupt request, and the CPU 102 then executes the interrupt handler to process the next interrupt request.

A means for setting the predetermined period of time during which the ICU 101 keeps holding the IRQ 106 at its active state and the value of the IRL 108 after the ICU 101 receives the IRQACK 107 can be implemented via either hardware or software. There can be provided a given circuit disposed within the ICU 101, for causing the IRQ 106 to make a transition to its deactivated state and clearing the value of the IRL 108 when the predetermined period of time elapses. Alternatively, there can be provided a given program which is stored in a ROM or the like disposed within the ICU 101, for causing the IRQ 106 to make a transition to its deactivated state and clearing the value of the IRL 108 when the predetermined period of time elapses. The predetermined period of time can be set according to the uses to which the information processing apparatus of the present invention is put.

As previously explained, the information processing apparatus according to the third embodiment of the present invention keeps holding the IRQ 106 at active state and delivering the IRL 108 even though the interrupt signal 104 furnished by one peripheral input/output device which is an interrupt request source is cleared during the interrupt preprocessing. Therefore, the third embodiment offers an advantage in that the CPU 102 can reliably execute an interrupt handler to process an interrupt request once the interrupt request is generated.

Fourth Embodiment

Figure 6:
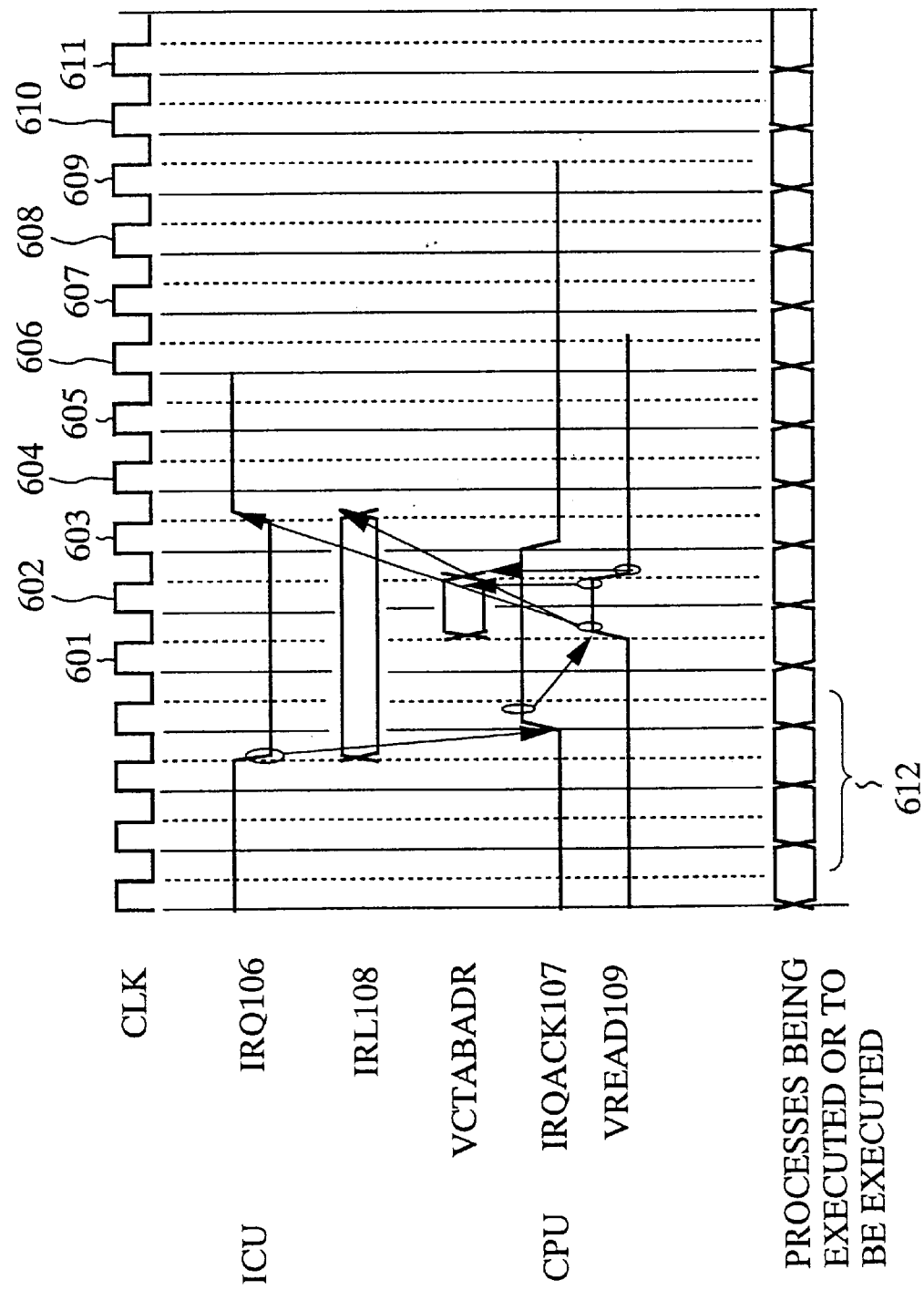
FIG. 6 is a timing chart showing the operation of an information processing apparatus using an interrupt processing method according to a fourth embodiment of the present invention.
Figure 7:
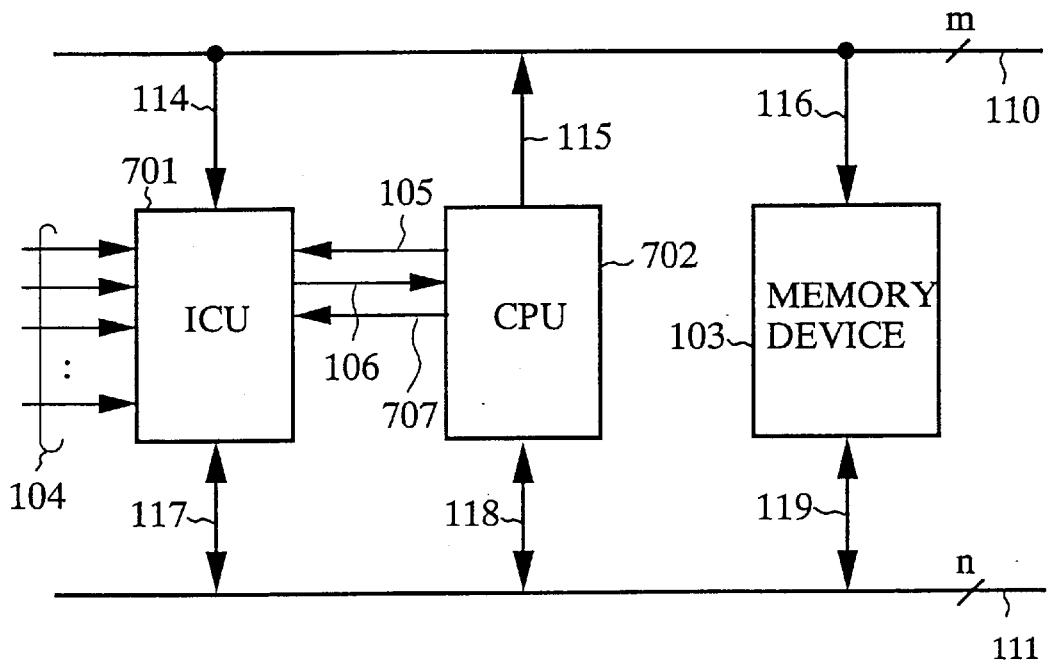
FIG. 7 is a block diagram showing the structure of a prior art information processing apparatus using a conventional interrupt processing method.
Figure 10:
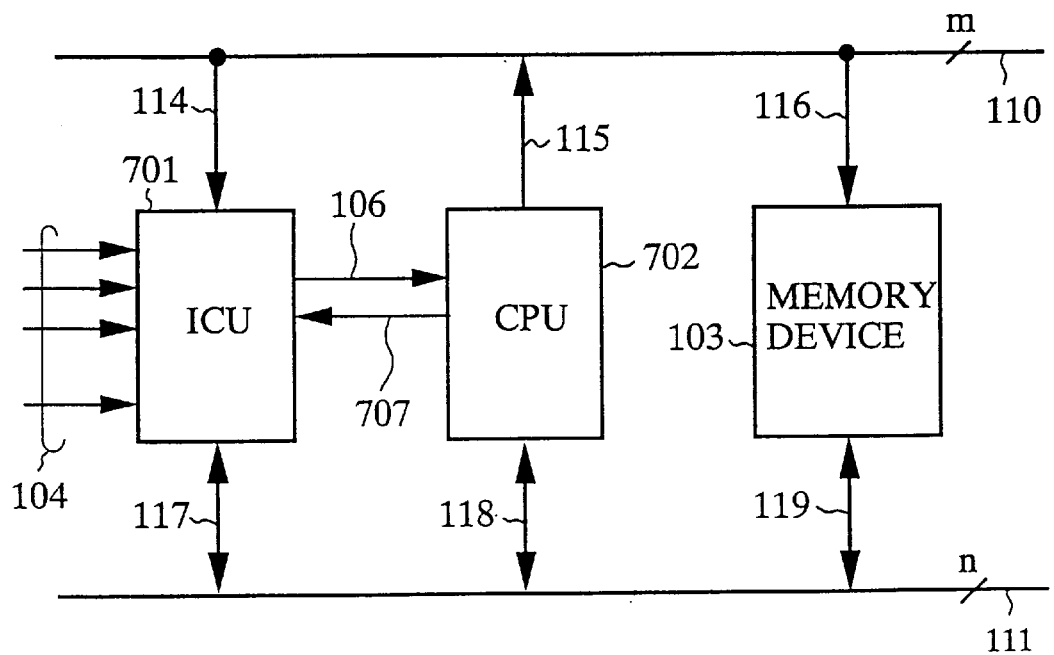
FIG. 10 is a block diagram showing the structure of a prior art information processing apparatus using another conventional interrupt processing method.
Figure 8:
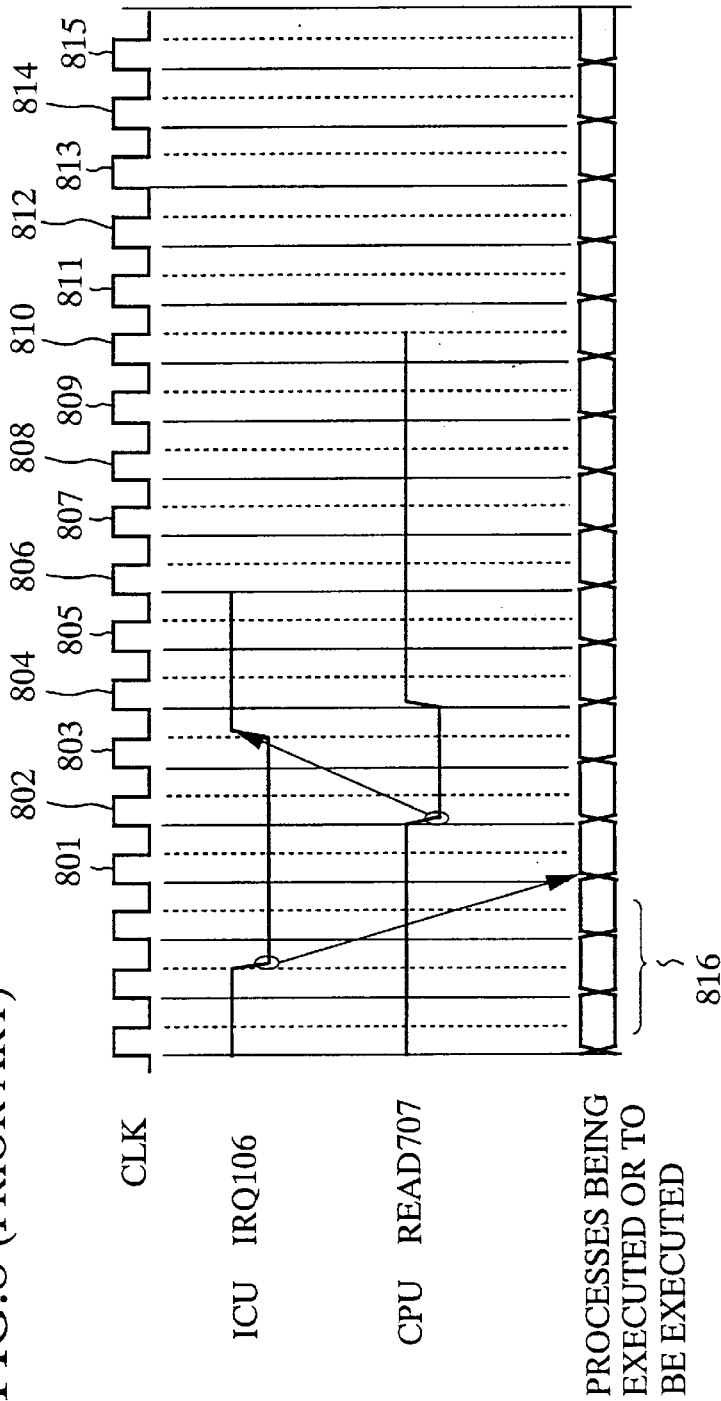
FIG. 8 is a timing chart showing the operation of the prior art information processing apparatus shown in FIG. 7.

Referring how to FIG. 6, there is illustrated a timing chart showing the operation of an information processing apparatus using an interrupt processing method according to a fourth embodiment of the present invention. While the information processing apparatus according to the fourth embodiment has the same structure as that of the above-mentioned first embodiment shown in FIG. 1, the information processing apparatus according to the fourth embodiment differs from that of the above-mentioned first embodiment in that the ICU 101 of this embodiment is adapted to keep holding the IRQ 106 delivered by the ICU 101 at its active state and the value of the IRL 108 during a predetermined period of time after the ICU 101 receives the VREAD 109 following the receipt of the IRQACK 107.

Like the above-mentioned first embodiment, the ICU 101 selects the interrupt signal 104 with the highest priority from a plurality of interrupt signals 104 received. Furthermore, the ICU 101 compares the interrupt priority assigned to the selected interrupt signal 104 with the interrupt mask level indicated by the IMASK 105 delivered by the CPU 102. As a result, if the interrupt priority of the interrupt signal 104 is greater than the interrupt mask level, the ICU 101 furnishes the IRQ 106 which corresponds to the selected interrupt signal 104 to the CPU 102. Then the ICU 101 writes an interrupt priority level 901 assigned to the IRQ 106 which is delivered to the CPU 102 and a VCTABADR 902 showing the address of an interrupt vector table storing the address specifying the origin of the corresponding interrupt handler into its interrupt information register (not shown in FIG. 1), as shown in FIG. 9.

When the CPU 102 receives the IRQ 106 from the ICU 101, it furnishes the IRQACK 107 to the ICU 101. On the other hand, the ICU 101 delivers the IRL 108 to the CPU 102 in synchronization with the delivery of the IRQ 106 to the CPU 102. When the ICU 101 receives the IRQACK 107 furnished by the CPU 102, the ICU 101 keeps holding the IRQ 106 at its active state (i.e., LOW state) during a predetermined period of time since the ICU 101 received the VREAD 109 following the receipt, of the IRQACK 107. Thus, the ICU 101 keeps holding the value of IRL 108 and the value of the VCTABADR which will be explained later. That is, the ICU 101 holds the contents in the interrupt information register (not shown in FIG. 1) disposed therein. It should be noted that the above-mentioned predetermined period of time is defined as a period of time during which the CPU 102 can read the address specifying the origin of the interrupt handler so as to reliably execute the interrupt handler.

Next, the CPU 102 completes a series of processes 512 which have been being executed just before it receives the IRQ 106 and, after that, starts a process called an interrupt preprocessing which corresponds to the IRQ 106. First, the CPU 102, in clock cycle 601 shown in FIG. 6, saves or clears the value of the program status word, and makes the signal line 115 connecting the CPU 102 to the address bus 110 be of high resistance. After that, the CPU 102 furnishes the VREAD 109 to enable the ICU 101 to send out the VCTABADR on the address bus 110 at a time which is dependent on the condition of the process within the CPU 101. When the ICU 101 receives the VREAD 109 from the CPU 102, the ICU 101 sends out the VCTABADR showing the memory location at which the address specifying the origin of a microprogram, i.e.; the interrupt handler to handle the interrupt request is stored on the address bus 110. At that time, since the signal line 115 extending from the CPU 102 is held at its high-impedance state, the VCTABADR is injected into the memory device 103 by way of the signal line 116 connecting the address bus 110 to the memory device 103. As a result, the memory device 103 sends out the address indicating the origin of the interrupt handler on the data bus 111 by way of the signal line 119 connecting the memory device 103 to the data bus 111. Then the CPU 102, in clock cycle 602 shown in FIG. 6, reads the address indicating the origin of the interrupt handler on the data bus 111.

Next, in order to push the address of a process which is scheduled to be executed after the execution of the process 612, which has been temporarily suspended to process the interrupt, i.e., the current contents in the program counter onto a stack, the CPU 102, in clock cycle 603, calculates the address specifying the locations within the stack at which the current contents in the program counter are to be stored, i.e., the stack pointer. Then the CPU 102, in clock cycle 604, pushes the current contents in the program counter onto the stack, and, after that, performs the remainder of the interrupt preprocessing and then starts to execute the interrupt handler. On the other hand, when the CPU 102 finishes reading the address showing the origin of the interrupt handler handling the interrupt request, the CPU causes the VREAD 109 furnished to the ICU 101 to make a HIGH to LOW transition such that the VREAD 109 is deactivated. After that, when the predetermined period of time elapses since the ICU 101 received the VREAD 109, the ICU 101 causes the IRQ 106 to make a LOW to HIGH transition such that the IRQ 106 is deactivated, and simultaneously clears the IRL 108. Thus, the ICU 101 clears the contents in the interrupt information register. Accordingly, the ICU 101 makes it possible to select the interrupt request with the highest priority from a plurality of delayed interrupt requests in order to handle the next interrupt request and cause the memory device to furnish a vector table address which corresponds to the next interrupt request with the highest priority. After that, the CPU 102 and ICU 101 repeat the above operation so as to perform the interrupt preprocessing for the next interrupt request, and the CPU 102 then executes the interrupt handler to process the next interrupt request.

A means for setting the predetermined period of time during which the ICU 101 keeps holding the IRQ 106 at its active state and the value of the IRL 108 after the ICU 101 receives the VREAD 109 can be implemented via either hardware or software. There can be provided a given circuit disposed within the ICU 101, for causing the IRQ 106 to make a transition to its deactivated state and clearing the value of the IRL 108 when the predetermined period of time elapses. Alternatively, there can be provided a given program which is stored in a ROM or the like disposed within the ICU 101, for causing the IRQ 106 to make a transition to its deactivated state and clearing the value of the IRL 108 when the predetermined period of time elapses. The predetermined period of time can be set according to the uses to which the information processing apparatus of the present invention is put.

As previously explained, the information processing apparatus according to the fourth embodiment of the present invention keeps holding the IRQ 106 at its active state and delivering the IRL 108 even though the interrupt signal 104 furnished by one peripheral input/output device which is an interrupt request source is cleared during the interrupt preprocessing. Therefore, the fourth embodiment offers an advantage in that the CPU 102 can reliably execute an interrupt handler to process an interrupt request once the interrupt request is generated.

As mentioned above, the present invention offers the following advantages.

In accordance with a preferred embodiment of the present invention, there is provided an information processing apparatus comprising: an ICU for receiving interrupt signals furnished by a plurality of peripheral input/output devices and for selecting one interrupt signal with the highest priority from the interrupt signals received so as to furnish an interrupt request signal and an interrupt priority level signal showing the interrupt priority of the interrupt request signal; a central processing unit (CPU), responsive to the interrupt request signal from the ICU, for furnishing an interrupt request acknowledge signal to the ICU, and, after that, furnishing a vector table address output permission signal to allow the ICU to output an interrupt vector table address by way of an address bus; and a memory device connected to the ICU and the CPU via the address bus and a data bus, for receiving the interrupt vector table address from the CPU and furnishing an address specifying the origin of a program handling the interrupt request onto the data bus. Furthermore, the ICU can hold the interrupt request signal at its active state and the value of the interrupt priority level signal during a predetermined period of time which is defined by the interrupt request acknowledge signal such that even though the interrupt signal which caused the interrupt request signal is cleared, the memory device can furnish the address showing the origin of the program and then the program can handle the interrupt request. Accordingly, the present invention provides an advantage in that the CPU can reliably execute the interrupt handler handling the interrupt request once the interrupt request is generated.

In accordance with a preferred embodiment of the present invention, the ICU holds the interrupt request signal at its active state and the value of the interrupt priority level signal at least until the CPU finishes reading the address specifying the origin of the program handling the interrupt request. Accordingly, the embodiment provides an advantage in that the CPU can reliably execute the interrupt handler handling the interrupt request once the interrupt request is generated.

Preferably, the CPU causes the interrupt request acknowledge signal to make a transition to its deactivated state when the CPU finishes reading the address specifying the origin of the program handling the interrupt request. Furthermore, in response to the transition in the interrupt request acknowledge signal, the ICU causes the interrupt request signal to make a transition to its deactivated state and then clears the interrupt priority level signal. Accordingly, the embodiment provides an advantage in that the CPU can reliably execute the interrupt handler handling the interrupt request once the interrupt request is generated.

In accordance with another preferred embodiment of the present invention, when the CPU finishes reading the address specifying the origin of the program handling the interrupt request, the CPU furnishes an interrupt request acknowledge end signal to the ICU. In response to the interrupt request acknowledge end signal, the ICU causes the interrupt request signal to make a transition to its deactivated state and then clears the interrupt priority level signal. Accordingly, the embodiment provides an advantage in that the CPU can reliably execute the interrupt handler handling the interrupt request once the interrupt request is generated.

In accordance with another preferred embodiment of the present invention, the ICU holds the interrupt request signal at its active state and the value of the interrupt priority level signal during the predetermined period of time since the ICU received the interrupt request acknowledge signal from the CPU. Accordingly, the present invention provides an advantage in that the CPU can reliably execute the interrupt handler handling the interrupt request once the interrupt request is generated.

In accordance with another preferred embodiment of the present invention, the ICU holds the interrupt request signal at its active state and the value of the interrupt priority level signal during the predetermined period of time since the ICU received the vector table address output permission signal delivered by the CPU following the interrupt acknowledge signal. Accordingly, the present invention provides an advantage in that the CPU can reliably execute the interrupt handler handling the interrupt request once the interrupt request is generated.

Preferably, the ICU can set the predetermined period of time during which the interrupt request signal is held at its active state and the value of the interrupt priority level signal is held, by using software. Accordingly, the present invention provides an advantage in that the CPU can reliably execute the interrupt handler handling the interrupt request once the interrupt request is generated. Furthermore, the embodiment offers an advantage of being able to set the predetermined period of time according to the uses to which the information processing apparatus of the present invention is put.

Many widely different embodiments of the present invention may be constructed without departing from the spirit and scope of the present invention. It should be understood that the present invention is not limited to the specific embodiments described in the specification, except as defined in the appended claims.

What is claimed is:

1. An interrupt processing method of receiving interrupt signals each having a designated priority level furnished by a plurality of peripheral input/output devices and selecting an interrupt signal having the highest priority from among the plurality of interrupt signals received in order to generate an interrupt request signal and an associated interrupt priority level signal indicating an interrupt priority value of the interrupt request signal, and executing a program to handle the interrupt request using a central processing unit (CPU), said method comprising the steps of:

causing the CPU to furnish an interrupt request acknowledge signal and a vector table address output permission signal in response to the interrupt request signal;

sending out an interrupt vector table address on an address bus in response to the vector table address output permission signal from the CPU;

causing a memory device to send out an address of a location of the program handling the interrupt request on a data bus according to the interrupt vector table address on the address bus; and holding the interrupt request signal at its active state and the value of the interrupt priority level signal during a period of time which is defined by the interrupt request acknowledge signal in order for the program to process the interrupt request even if the interrupt signal has been cleared.

2. The method according to claim 1, wherein the interrupt request signal is held at its active state and the value of the interrupt priority level signal is constant at least until the CPU finishes reading the address specifying the origin of the program to process the interrupt request.

3. The method according to claim 2, wherein the CPU causes the interrupt request acknowledge signal to make a transition to a deactivated state when the CPU finishes reading the address specifying the origin of the program to process the interrupt request, and wherein said deactivation causes the interrupt request signal to make a transition to a deactivated state and clears the interrupt priority level signal.

4. The method according to claim 2, wherein when the CPU finishes reading the address specifying the origin of the program handling the interrupt request, the CPU furnishes an interrupt request acknowledge end signal causing the interrupt request signal to make a transition to a deactivated state and clearing the interrupt priority level signal.

5. The method according to claim 1, wherein said holding of the interrupt request signal at an active state and the value of the interrupt priority level signal constant during a predetermined period of time commences from the time of the receipt of the interrupt request acknowledge signal from the CPU.

6. The method according to claim 1, wherein said holding of the interrupt request signal at an active state and the value of the interrupt priority level signal constant during a predetermined period of time commences from the time of the receipt of the vector table address output permission signal from the CPU following the receipt of the interrupt acknowledge signal.

7. An information processing apparatus comprising:

an interrupt control means which receives interrupt signals each having a designated priority level furnished by a plurality of peripheral input/output devices and selects an interrupt signal having the highest priority from among the plurality of interrupt signals received in order to furnish an interrupt request signal and an associated interrupt priority level signal indicating an interrupt priority value of the interrupt request signal;

a central processing unit (CPU) being responsive to the interrupt request signal from said interrupt control means for furnishing an interrupt request acknowledge signal to said interrupt control means followed by an interrupt vector table address output permission signal to enable said interrupt control means to send out an interrupt vector table address on an address bus;

a memory means, connected to said interrupt control means and said CPU via the address bus and a data bus, for receiving the interrupt vector table address which said interrupt control means has sent out on the address bus in response to the interrupt vector table address output permission signal, and for sending out an address specifying the location of the origin of a program to process the interrupt request on the data bus; and said interrupt control means including an interrupt request holding means for holding the interrupt request signal at an active state and the value of the interrupt priority level signal constant during a period of time which is defined by the interrupt request acknowledge signal in order for the memory means to furnish the address showing the origin of the program to enable the program to handle the interrupt request even after the interrupt signal causes the interrupt request signal to clear.

8. The information processing apparatus according to claim 7, wherein said interrupt request holding means is a means for holding the interrupt request signal at an active state and the value of the interrupt priority level signal constant at least until said CPU finishes reading the address specifying the origin of the program handling the interrupt request.

9. The information processing apparatus according to claim 8, wherein said CPU causes the interrupt request acknowledge signal to make a transition to a deactivated state when said CPU finishes reading the address specifying the origin of the program handling the interrupt request, and wherein said interrupt request holding means is responsive to the transition in the interrupt request acknowledge signal for causing the interrupt request signal to make a transition to a deactivated state and clearing the interrupt priority level signal.

10. The information processing apparatus according to claim 8, wherein when said CPU finishes reading the address specifying the origin of the program handling the interrupt request, said CPU furnishes an interrupt request acknowledge end signal to said interrupt control means, and wherein said interrupt request holding means is responsive to the interrupt request acknowledge end signal, for causing the interrupt request signal to make a transition to a deactivated state and clearing the interrupt priority level signal.

11. The information processing apparatus according to claim 7, wherein said interrupt request holding means is a means for holding the interrupt request signal at an active state and the value of the interrupt priority level signal constant for a predetermined period of time commencing from the time at which said interrupt control means has received the interrupt request acknowledge signal from said CPU.

12. The information processing apparatus according to claim 11, wherein said interrupt request holding means includes a means for setting the predetermined period of time during which the interrupt request signal is held at an active state and the value of the interrupt priority level signal is constant by the use of software.

13. The information processing apparatus according to claim 7, wherein said interrupt request holding means is a means for holding the interrupt request signal at an active state and the value of the interrupt priority level signal constant during a predetermined period of time commences from the time at which said interrupt control means has received the vector table address output permission signal delivered by said CPU following the receipt of the interrupt acknowledge signal.

14. The information processing apparatus according to claim 13, wherein said interrupt request holding means includes a means for setting the predetermined period of time during which the interrupt request signal is held at an active state and the value of the interrupt priority level signal is constant by the use of software.

\* \* \* \* \*